Figure 1:
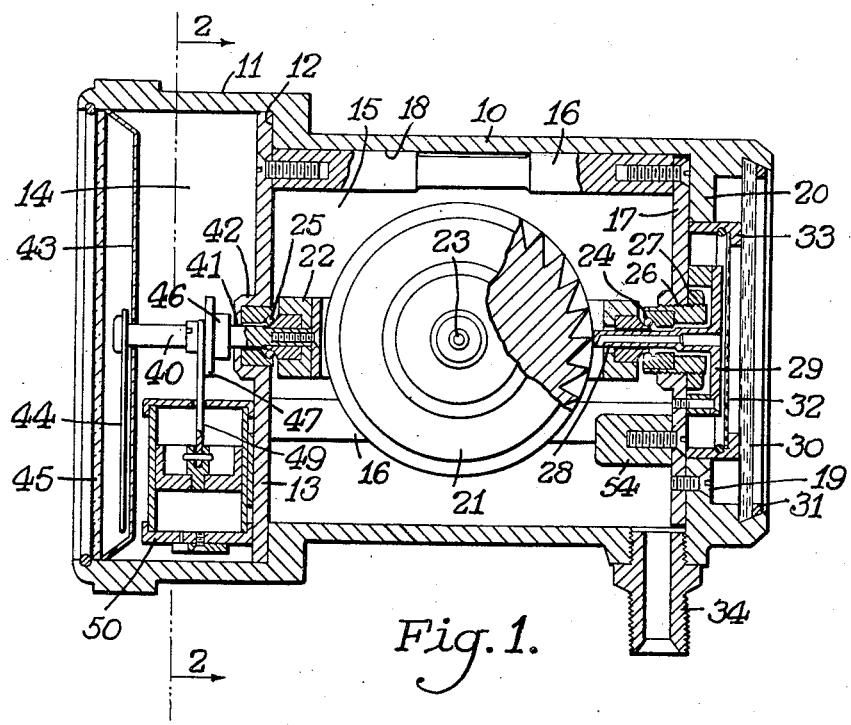

March 13, 1951     G. H. REID     2,544,767

GYROSCOPIC RATE-OF-TURN INDICATOR

Filed Feb. 18, 1946

INVENTOR.
GEORGE HANCOCK REID
BY
ATTORNEY.

Patented Mar. 13, 1951

2,544,767

UNITED STATES PATENT OFFICE 2,544,767

GYROSCOPIC RATE-OF-TURN INDICATOR

George Hancock Reid, Kirby Muxloe, near Leicester, England

Application February 18, 1946, Serial No. 648,240
In Great Britain April 30, 1945

4 Claims. (Cl. 33—204)

This invention relates to gyroscopic instruments for navigation and the like and it has for its object to provide an improved construction of mounting for the instrument mechanism, said mounting being simple in design and being arranged in such a manner as to enable the instrument to function accurately for long periods without attention.

The invention is concerned more particularly with gyroscopic instruments in which a gyro rotor is driven by a current of air, said current either being induced by exhausting the space in which the gyro rotor revolves, or being produced by feeding compressed air to the instrument. In instruments such as this it is, of course, customary to filter the incoming air, but it is found in practice that however thoroughly the filtering is carried out a certain amount of dust does manage to reach the gyro rotor, and this dust naturally tends to settle on the working parts of the mechanism, thereby reducing the efficiency of the instrument.

It is an object of this invention to provide a construction for gyroscopic instruments in which the casing is divided into a pair of mutually isolated compartments; and in which the air operated rotor is located in one of the compartments and the remainder of the mechanism is located in the other compartment, so that the mechanism is effectively segregated from the dust or other foreign particles that may enter the rotor containing compartment.

It is another object of the invention to provide an improved gyroscopic rate of turn indicator comprising a casing, a gimbal ring pivotally mounted therein and carrying an air driven rotor, an indicator, dash-pot and movement-controlling spring operated by the gimbal ring, a partition which divides the interior of the casing into two compartments, the gimbal ring and rotor being contained within one compartment, and the indicator, dash-pot and controlling spring within the other compartment, a rotary spindle extending from the gimbal ring coaxial with the pivots thereof, through a snugly fitting hole in the partition, the partition being otherwise imperforate so that it isolates the two compartments and thus prevents free circulation of air from one to the other, and an elongated plate within the said other compartment having its central part fixedly secured to the spindle of the gimbal ring, the free ends of said plate being connected respectively with the movement-controlling spring and the dash-pot.

A further object is to provide a gyroscopic rate of turn indicator comprising a casing, a gimbal ring pivotally mounted therein and carrying an air driven rotor, an indicator, a dash-pot and a movement-controlling spring operated by the gimbal ring, a partition which divides the interior of the casing into two compartments, the gimbal ring and rotor being contained within one compartment, and the indicator and dash-pot being disposed within the other compartment, a rotary spindle extending from the gimbal ring coaxial with the pivots thereof, through a snugly fitting hole in the partition, the partition being otherwise imperforate so that it isolates the two compartments and thus prevents free circulation of air from one side of the partition to the other, a ball bearing for supporting the gimbal ring having its outer race secured fixedly to the partition, while its inner race is mounted upon the gimbal spindle, a rear plate disposed parallel with the partition, a plurality of supports extending from the partition to said rear plate forming a cage-like structure, a ball bearing secured to said rear plate forming a pivotal mounting for the rear end of said gimbal ring, and an air nozzle extending through said ball bearing and through said gimbal ring so that air issuing from said nozzle impinges upon the periphery of said rotor.

It will be understood that in order to obtain the benefits of the invention, the actuated mechanism must be enclosed sufficiently to prevent the free circulation of air from the driving mechanism. Thus where a rotatable spindle or like member transmits motion to the actuated mechanism, the spindle or other member would extend through a partition opening providing just sufficient clearance for working freedom; an airtight joint would not ordinarily be obtained, but substantial free circulation of air to and from the actuated mechanism would be effectively eliminated. On the other hand, in instruments which have hitherto been proposed, a partition has been used to divide the casing into an actuated mechanism containing compartment, and a compartment containing the rotor and driving means. However, the mechanical coupling between the usual rotor gimbal frame and actuated mechanism usually had a swinging mechanism and extended through a partition opening leaving a large clearance area permitting the air to circulate freely into and out of the compartment containing the actuated mechanism.

Figure 2:
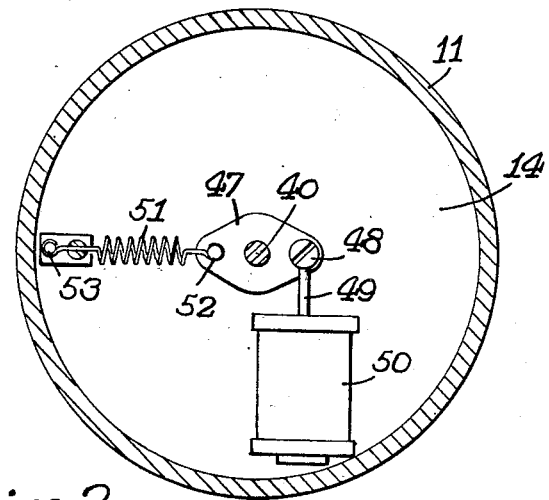

The invention is illustrated by way of example in the accompanying diagrammatic drawings in which:

Figure 1 is a longitudinal sectional elevation of a rate of turning indicator; and Figure 2 is a transverse section on the line 2—2 of Figure 1.

The instrument comprises a casing 10 of general cylindrical tubular shape, the front part 11 of the casing being of somewhat enlarged diameter so as to provide a radial shoulder 12. Against this shoulder 12 rests a stout circular metal plate 13 constituting a partition member which divides the interior of the casing 10 into two compartments, namely a front compartment 14 and a rear compartment 15. The plate 13 also serves as a foundation member for the mechanism of the instrument. Thus to its rear surface is secured a cage comprising a plurality of longitudinal spacing rods 16 and a circular rear plate 17, the cage 16, 17 preferably being a loose fit within the bore 18 of the casing 10 so as to make sure that the partition member 13 can rest firmly against the shoulder 12. The partition plate 13 and cage 16, 17 are held in position within the casing 10 by one or more screws 19 passing through a circumferential flange 20 into the margin of the rear plate 17.

A gyro rotor 21 is as usual freely pivoted within a rectangular gimbal frame 22 so as to be rotatable about a transverse, normally horizontal, axis, the spindle of the gyro rotor 21 being indicated at 23. The gimbal frame 22 is itself free to rock about an axis extending longitudinally of the instrument, said frame being pivoted to the rear plate 17 by a bearing 24 and to the partition plate 13 by a bearing 25. The bearing 24 is adjustable owing to the provision of a screw thread 26 and lock nut 27, said bearing being bored longitudinally for the accommodation of an air nozzle 28 formed integrally with a circular plate 29 which is secured to the back of the rear plate 17. The rear end of the casing 10 is recessed internally for the reception of a primary filter disc 30 which is held in position by a locking ring 31; a secondary filter 32 is also provided and is fitted into a short sleeve 33 which is accommodated within the flange 29 of the casing 10. The latter is provided with an air outlet or suction union 34 adapted to be connected by a pipe line (not shown) to any suitable suction producing device such for instance as an exhauster or a Venturi tube. This causes air to be drawn in from the atmosphere through the filters 30 and 32, said air as it leaves the nozzle 28 in the form of a jet, impinging against bucket recesses formed around the circumference of the gyro rotor 21, said rotor thus being driven continuously at high speed in the known manner.

A spindle 40 extends forwardly from the front end of the gimbal frame 22 through a closely fitting hole 41 formed in a bearing housing 42 at the centre of the partition plate 13, the clearance between the spindle 40 and the hole 41 being as small as possible so as to avoid diffusion of dust therethrough as far as is practicable. The extremity of the spindle 40 protrudes through a sheet metal dial plate 43 and is fitted with a pointer 44 arranged to be visible through a circular glass window 45 sealed into the front of the casing portion 11. A collar 46 fast upon the spindle 40 carries an oval plate 47 which extends horizontally as will be seen in Figure 2, the right hand part of said plate being pivotally connected at 48 with the piston rod 49 of a dash-pot damping device 50 mounted upon the front of the partition plate 13; a centralizing tension spring 51 extends from a projection 52 upon the plate 47 to an adjustable anchorage 53 so as to urge the gimbal frame 22 in either direction towards its normal horizontal position. As is well known in the art, such an arrangement makes the pointer 44 responsive to rate of turning of the instrument as a whole, the force of precession exerted by the gyro rotor 21 causing the gimbal frame 22 to tilt in the appropriate direction and stretch the centralizing spring 51, which latter returns the gimbal frame 22 to its horizontal position when the turning ceases. An abutment stop 54 secured to the rear plate 17 acts to limit the angular movement of the gimbal frame 22.

It will be seen that the compartment 15 which contains the turbulent air from the nozzle 28 (constituting the driving means for the gyro rotor 21) is substantially isolated from the compartment 14 containing the actuated mechanism, namely, the dash-pot device 50, the return spring 51 and the indicating hand 44; therefore any dust that might penetrate the primary and secondary filters 30, 32 is most unlikely to gain access to the compartment 14 so that the working parts of the actuated mechanism are kept free from dust and are therefore able to operate efficiently and accurately over a long period of time. Moreover the fact that the glass window 45 is sealed in position prevents air leaking into the compartment 14 from the atmosphere owing to the working depression within the compartment 15.

The invention thus provides a relatively simple and very compact form of instrument, which is reliable and which is capable of operating efficiently for extended periods owing to the manner in which the more delicate parts of its mechanism are protected from dust and other foreign matter.

It will be understood that the device which has been described is given merely by way of example and that various modifications may be made in the form and construction of the mechanism. In some cases the gyro rotor may be driven by compressed air.

What I claim is:

1. In a gyroscopic rate-of-turn indicator having a casing, a gimbal ring pivotally mounted in the casing and carrying an air driven rotor, and an indicator, dash-pot and movement controlling spring operated by the gimbal ring; a partition disposed in said casing dividing the latter into two compartments; the gimbal ring and rotor being contained within one compartment, and the indicator, dash-pot and controlling spring being contained in the other compartment, a rotary spindle extending from the gimbal ring coaxially with the pivots thereof and through a snugly fitting hole in said partition, the partition being otherwise imperforate to isolate the two compartments and thus prevent free circulation of air from one to the other, and an elongated plate disposed within said other compartment having its central part fixedly secured to said spindle of the gimbal ring, the free ends of said plate being connected respectively with the movement controlling spring and the dash-pot.

2. In a gyroscopic rate-of-turn indicator having a casing, a gimbal ring pivotally mounted therein and carrying an air driven rotor, and an indicator, dash-pot and movement-controlling spring operated by the gimbal ring; a partition which divides the interior of the casing into two compartments, the gimbal ring and rotor being contained within one compartment, and the indicator, dash-pot and controlling spring being disposed within the other compartment, a rotary spindle extending from the gimbal ring coaxial with the pivots thereof, through a snugly fitting hole in the partition, the partition being otherwise imperforate so that it isolates the two compartments and thus prevents free circulation of air from one side of the partition to the other, a ball bearing for supporting the gimbal ring having its outer race secured fixedly to the partition, while its inner race is mounted upon the gimbal spindle, a rear plate disposed parallel with the partition, a plurality of supports extending from the partition to said rear plate forming a cage-like structure, a ball bearing secured to said rear plate forming a pivotal mounting for the rear end of said gimbal ring, and an air nozzle extending through said ball bearing and through said gimbal ring so that air issuing from said nozzle impinges upon the periphery of said rotor.

3. In a gyroscopic rate-of-turn indicator having a casing, a gimbal ring pivotally mounted therein and carrying an air driven rotor, and an indicator, a dash-pot and a movement-controlling spring operated by the gimbal ring; a partition which divides the interior of the casing into two compartments, the gimbal ring and rotor being contained within one compartment, and the indicator, dash-pot and controlling spring being disposed within the other compartment, a rotary spindle extending from the gimbal ring coaxial with the pivots thereof, through a snugly fitting hole in the partition, the partition being otherwise imperforate so that it isolates the two compartments and thus prevents free circulation of air from one side of the partition to the other, a ball bearing for supporting the gimbal ring having its outer race secured fixedly to the partition, while its inner race is mounted upon the gimbal spindle, a rear plate disposed parallel with the partition, a plurality of supports extending from the partition to said rear plate forming a cage-like structure supporting said gimbal ring, and means securing said rear plate to the back of said casing to hold said cage and said partition in position within said casing.

4. A gyroscopic rate-of-turn indicator comprising a casing; a partition extending across said casing and dividing the latter into two compartments; a pivotally mounted gimbal ring and an air driven rotor on said gimbal ring disposed in one of said compartments; an indicator, dash-pot and movement-controlling spring disposed in the other of said compartments; a rotary spindle extending from said gimbal ring coaxial with the pivots of the latter and through a snugly fitting opening in said partition, said partition being otherwise imperforate for mutually isolating said compartments and thus preventing free circulation of air from one compartment to the other; said spindle being directly connected to said indicator for operating the latter; and a rock lever centrally fixed upon said spindle in said other compartment, the opposite ends of said rock lever being connected respectively to said movement-controlling spring and said dash-pot.

GEORGE HANCOCK REID.

REFERENCES CITED

The following references are of record in the file of this patent:

UNITED STATES PATENTS

| Number | Name | Date |
| --- | --- | --- |
| 1,946,657 | Zand | Feb. 13, 1934 |
| 2,053,183 | Crane et al. | Sept. 1, 1936 |
| 2,291,612 | Draper | Aug. 4, 1942 |
| 2,380,079 | Schwien | July 10, 1945 |